United States Patent Office 3,384,649
Patented May 21, 1968

---

3,384,649
CRYSTALLINE CYCLIC ORGANOTIN COMPOUNDS AND PROCESS OF MAKING THE SAME
Otto S. Kauder, Jamaica, N.Y., assignor to Argus Chemical Corporation, Brooklyn, N.Y., a corporation of Delaware
No Drawing. Continuation-in-part of application Ser. No. 454,966, May 11, 1965. This application Aug. 28, 1967, Ser. No. 663,529
12 Claims. (Cl. 260—429.7)

ABSTRACT OF THE DISCLOSURE

Cyclic crystalline organotin compounds that are polymers of dipropyl, dibutyl or diamyl tin aromatic acid salts and a process for preparing such salts, are provided, that comprise the structural units:

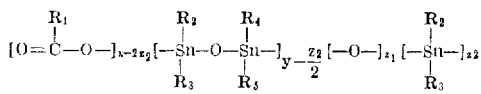

In the above formula, $R_1$ is an aromatic radical, and $R_2$, $R_3$, $R_4$ and $R_5$ are alkyl radicals having from three to five carbon atoms, $x$ is a number from about 0.7 to about 17, $y$ is a number from 1 to about 5, and the ratio $x/y$ is within the range from about 0.7 to about 3.5.

The [—O—] groups serve as linking radicals between

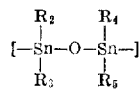

groups, and the

groups may be linked coordinately thereto as residues of the normal salts.

---

This application is a continuation-in-part of Ser. No. 454,966, filed May 11, 1965, now abandoned.

This invention relates to crystalline cyclic organotin compounds and to a process for preparing such compounds, and more particularly to polymeric dipropyltin, dibutyltin and diamyltin salts of aromatic acids and to a process for preparing such crystalline cyclic polymeric salts by reacting the corresponding organotin salts with organotin oxides. The invention also relates to halogen-containing resins stabilized with such compounds, to a process for stabilizing halogen-containing resins by incorporating such compounds with the resin, and also to stabilizer compositions for halogen-containing resins including an organotin compound of the invention.

Organotin compounds generally are recognized as stabilizers of high efficiency for halogen-containing resins such as polyvinyl chloride and copolymers of vinyl chloride and vinyl acetate or other copolymerizable monomers. Most of the commonly used organotin compound stabilizers are liquids. Some of these have a strong odor that cannot be entirely overcome in the resin composition. A liquid stabilizer is difficult to handle under certain conditions, and in addition, when used in relatively large proportions, may undesirably diminish the softening temperature of the resin. Furthermore, these tin compounds are usually toxic and therefore have not been used in containers for foodstuffs. This toxicity is important because of the generally high solubility of organotin materials in organic solvents, which results in the migration of the stabilizer into any organic material contained therein.

Two well-known organotin compounds which are solids are dibutyltin oxide and dibutyltin maleate. Although dibutyltin oxide is not readily soluble it is a poor stabilizer in halogen-containing resins. Dibutyltin maleate has good stabilizing properties but introduces odors during processing, and tends to produce compositions which plate out on the rolls and have poor lubricity. In many cases, the resin compositions containing this stabilizer are brittle. The art has accordingly accepted the liquid condition of organotin stabilizers as the optimum, and many such stabilizers have been formulated and marketed. Furthermore, workers in this field considered easy solubility of organotin stabilizers to be desirable, to simplify blending and forming of resin compositions.

Organotin compounds containing tin linked to carbon in the form of alkyl, aryl, heterocyclic or alicyclic groups and to oxygen in the form of carboxylate groups such as maleate, benzoate, laurate, or acetate are the subject of many patents. U.S. Patent No. 2,307,157 to Quattlebaum et al., dated Jan. 5, 1943, is a very early patent in this field, and describes organotin salts of alpha, beta-ethylenically unsaturated carboxylic acids such as dibutyltin dimaleate. Quattlebaum et al. point out that the organotin salts of saturated carboxylic acids are less satisfactory than the salts of the unsaturated acids, because of a decrease in clarity in the finished resin.

Saturated acid salts of organotin bases are described in Yngve U.S. 2,307,092, dated Jan. 5, 1943, and in U.S. Patent No. 2,560,034, dated July 10, 1951 to Eberly. Eberly also discloses the alkyltin salts of aromatic acids such as the benzoates, heterocyclic acids such as the furoates, and dibasic saturated acids such as the succinates and sebacates.

Mack et al. in Patent No. 2,592,926, dated Apr. 15, 1952, point out that with increasing length of the carboxylic chain the compatibility of organotin salts of the higher fatty acids is decreased. If dibutyltin dilaurate is used in amounts of more than 2 to 3%, for instance, it tends to exude or sweat out, giving an oily or greasy film on the surface. Furthermore, films prepared from such resins show a slight haze instead of the clarity desired.

The saturated organotin carboxylic acid salts have not, however, been outstanding stabilizers. Accordingly, the art proceeded to develop organotin thio acid monoester salts, such as the mercaptoalkanoic acid esters of U.S. Patents Nos. 2,641,588 and No. 2,641,596, dated June 9, 1953, to Leistner et al., and U.S. Patent No. 2,648,650 to Weinberg et al., dated Aug. 11, 1953. These compounds are now recognized as the best available organtotin stabilizers. They are, of course, liquids, but they impart outstanding stability to halogenated resins containing them, and they are markedly free from undesirable side effects. The only problem is their odor.

Attempts have been made to develop polymeric organotin salts which are useful stabilizers for halogen-containing resins and which have low vapor pressures at the high processing temperatures of the resin. Mack et al. in U.S. patents, No. 2,592,926 dated Apr. 15, 1952, No. 2,626,953, dated Jan. 27, 1953, and No. 2,628,211, dated Feb. 10,1953, describe a number of organotin compounds derived from polymers of dialkyltin oxides. The compounds disclosed in Patent No. 2,592,926 have the formula:

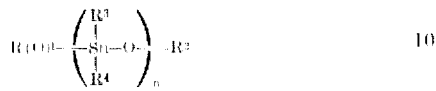

wherein $RO^1$ is an aliphatic, alicyclic or aryl alkoxy radical, $R^2$ is the residue of an alkyl, alicyclic or aryl radical of the $(RO)^1$ group, and $R^3$ and $R^4$ stand for members of the group consisting of alkyl and aryl. $n$ designates the degree of polymerization, and can be a number having a value higher than 1.

The compounds of No. 2,626,953 have the formula:

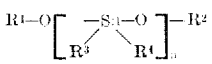

wherein $R^1$ and $R^2$ are alkyl, aralkyl or alicyclic groups attached to the terminal oxygen of the central tin oxide chain through a carbon-oxygen linkage, $R^3$ and $R^4$ stand for alkyl or aryl radicals, and $n$ is any number higher than 1.

The polymers of No. 2,628,211 to Mack et al. are the esters of the polymeric stannanediols having the formula:

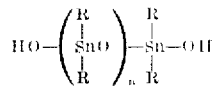

where R is alkyl or aryl, and $n$ is a numeral from 1 to 11. These linear polymeric stannanediols are esterified by reaction with an aliphatic monocarboxylic or dicarboxylic saturated or unsaturated acid. The polymeric material may also be formed by the polymerization of the monomeric salt, i.e.,

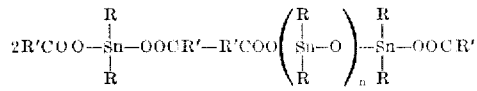

Naphthenic acid is referred to, and aromatic acid esters also are suggested generally. The specific materials named or tested, however, are all linear polymers, and as such have a relatively low melting point, compared to a three-dimensional cage-type polymer. Furthermore, Mack et al. indicate that they want an organotin material that is soluble and therefore more easily dispersed in the resin.

The working examples of No. 2,628,211 describe, for instance, the preparation of dialkyltin aliphatic carboxylic acid salts of the formula:

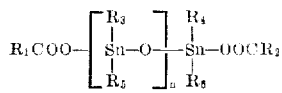

Mack et al. could also obtain the higher polymers wherein all of the R's were aliphatic groups and $n$ is an integer from 2 to 10. Example 2, for instance, describes a polymeric dibutyltin diacetate in the form of a dimer, a trimer and a heptamer solid. Example 3 describes a dibutyltin di(2-ethylhexoate) which was polymerized. However, the only crystalline compound disclosed or suggested by Mack et al. was a diaryltin compound. All of the dialkyltin compounds were either liquids, or waxy solids in the case of the higher polymers. The diaryltin materials are not as effective stabilizers as are the dialkyltin compounds.

Sawyer in U.S. Patent No. 3,083,217 discloses di(tin) compounds having the general formula:

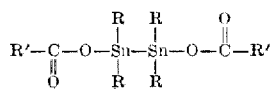

These materials represent a departure from the above-cited references in that they lack the

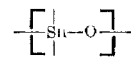

group common to the earlier compounds wherein each tin atom in the molecule is joined only to carbon or to oxygen.

The problem with most of these compounds, however, is that the low molecular weight compounds which are more compatible with the resins are liquids or relatively low-melting solids, and the high molecular weight compounds, which are solids and resemble the dialkyltin oxides are poorly compatible and less effective as stabilizers than the simple dialkyltin diacylates. (See No. 2,628,211, column 3, lines 19–28.) In addition, most of the materials that are fairly high-melting solids are not crystalline, but are rather waxy, amorphous materials which have at least some of the structural deficiencies of liquids, and lack the solvent resistance of three-dimensional crystalline compounds. Although some of the basic dibutyltin acetates are crystalline solids, they melt at 80° C. or lower and are readily soluble in organic solvents.

In accordance with the invention, cyclic crystalline polymeric dialkyltin salts of aromatic carboxylic acids are provided which have the extremely useful characteristics of melting at a temperature above 90° C. and relatively insoluble in the usual organic solvents. These organotin compounds are polymers of dipropyl, dibutyl or diamyl tin aromatic acid salts.

These organotin compounds comprise structural units which can be represented as follows:

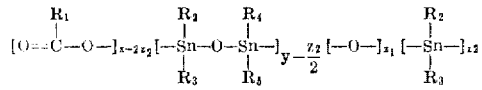

In the above formula, $R_1$ is an aromatic radical, having up to about thirty carbon atoms, and $R_2$, $R_3$, $R_4$ and $R_5$ are alkyl radicals having from three to five carbon atoms, such as n-propyl, isopropyl, n-butyl, isobutyl, sec-butyl, tert-butyl, n-amyl isoamyl, sec-amyl, 2-methyl butyl ("active" amyl) and tert-amyl.

$x$ is a number from about 0.7 to about 17. When $x$ is other than an even integer, it will be understood that $x$ represents an average value of $x$ units in different molecules.

$y$ is a number from 1 to about 5. When $$y - \frac{z_2}{2}$$

is not an integer, it will be understood that it represents an average value for $y$ groups in different molecules.

The ratio $x/y$ is within the range from about 0.7 to about 3.5, and preferably from about 1 to about 3. The most preferred compounds have the ratio $x/y$ of from about 1.7 to about 2.5.

$$z_1 = \frac{2y - x}{2}$$

(when $x$ is equal to or greater than $2y$, $z_1 = 0$)

$z_2 = x - 2y$ (when $2y$ is equal to or greater than $x$, $z_2 = 0$)

When $2y - x = 0$ and $x - 2y = 0$, $z_1$ is equal to $z_2$, and both are equal to 0.

The
[—O—] groups serve as linking radicals between

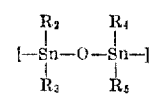

groups, and the

groups may be linked coordinately thereto as residues of the normal salts. It will be evident that when the ratio $x/y$ is 4 the compound is in fact the normal salt, and when $x$ is 0, $z_2$ is 0, $y$ is 1 and $z_1$ is 1, the compound is dialkyltin oxide. Both of these compounds, of course, are outside of the scope of the compounds of the invention, as represented by the above.

The aromatic ring can have from 1 to 5 substituents per ring, preferably not over 3, with the ortho positions free. Suitable substituent groups include organic groups such as aliphatic, cycloaliphatic, aromatic and heterocyclic substituent groups, as well as inorganic groups such as halogen, nitro and hydroxy. Preferably, the substituent groups are alkyl groups having up to ten carbon atoms, and aryl groups, alkaryl or aralkyl groups and condensed aryl or aralkyl groups having up to twenty-five carbon atoms each and unsaturated aliphatic groups, the groups being connected to the ring directly or through oxygen, sulfur or nitrogen atoms. The organic substituent groups may be hydrocarbon or they may be substituted with inert radicals such as, for example, halogen, phosphate, hydroxy, carbalkoxy, carbonyl, etc.

Typical alkyl substituents include methyl, ethyl, propyl, isopropyl, butyl, isobutyl, tertiary butyl, amyl, hexyl, heptyl, octyl, nonyl, decyl and the various isomers of each. Exemplary aryl substituents include phenyl, naphthyl and phenanthryl. Exemplary alkaryl or aralkyl substituents include o-tolyl, p-tolyl, m-tolyl, m-xylyl, p-xylyl, p-butylphenyl, p - isononylphenyl, p - tertiary octylphenyl, beta-methylnaphthyl, alpha - methylnaphthyl. Heterocyclic groups include furyl and furfuyl and cycloaliphatic groups include cyclopentyl and cyclohexyl.

Examples of the preferred aromatic R groups include: p-tolyl, p-phenoxyphenyl, 3,4 - dimethylphenyl, p-t-butylphenyl, salicyl, p-ethylphenyl, p-cresotinyl, p-chlorophenyl, p-chloroethylphenyl, p-ethylthiophenyl, p - nitrophenyl, p-diphenyl, beta-naphthyl, 5-ethyl-beta-naphthyl, 7-chloro-beta-naphthyl, p-propylphenylphenyl, p-4-nitrooctylphenyl, p - hydroxyethylphenyl, p - styrylphenyl, 7-hexyl-beta-naphthyl, p-naphthylphenyl, p-phenylthiophenyl, p-pyridinophenyl, p-furfurylphenyl, p-thienylphenyl, p-furylphenyl, pyranlphenyl and p-indolylphenyl.

These novel polymeric salt compounds are characterized by alkyl radicals having three to five carbon atoms linked to the tin through carbon, and by aromatic carboxylate radicals linked to tin through the oxygen atoms of the carboxylic acid group. In addition, the tin atoms are linked in a ring through oxygen and carbon atoms.

The compounds in the preferred group of this invention have a melting point maximum at a degree of polymerization where $x/y$ is in the range between about 1.7 and about 2.5 and ideally where $x/y$ equals 2.0. This group is characterized as having $R_1$ being selected from the group consisting of meta- and para-substituted phenyl unsubstituted in the ortho position and beta-naphthyl groups.

This preferred group of materials has a maximum melting point where $x/y$ is about 2.0, that is above 110° C., and do not soften below 100° C. This high melting three-dimensional crystalline material does not decrease the structural rigidity of an unplasticized resin to which the material is added. In addition, these materials unexpectedly have a low solubility in organic solvents, which of course, makes them valuable for resins used to make containers for organic materials such as liquid solvents or foodstuffs. These preferred materials, as a result of their lower solubility, exhibit a lower tendency to migrate and are therefore useful as additives for resins used for the manufacture of containers for food.

The representational formula of the constituent units of the compounds of the invention is not a structural formula, but the units shown are believed to be linked in a cyclic structure. The prior art polymeric compounds containing more than one tin atom, such as those of U.S. Patents Nos. 2,592,926, 2,626,953 and 2,628,211, are represented as linear polymers made of $$-\overset{|}{\underset{|}{Sn}}-O$$

units. It is believed, in contrast, that the compounds of the invention are cyclic polymers.

Unlike the prior art linear polymers, the compounds of the invention are believed to have cyclic structures illustrated by the following possible structures, using polymeric dibutyltin toluate as illustrative:

1.  $x = 2$  $x/y = 0.5$  $R =$ $- CH_3$
    $y = 4$  $z_1 = 3$  $R_1R_2R_3R_4 = C_4H_9$
    $z_2 = 0$

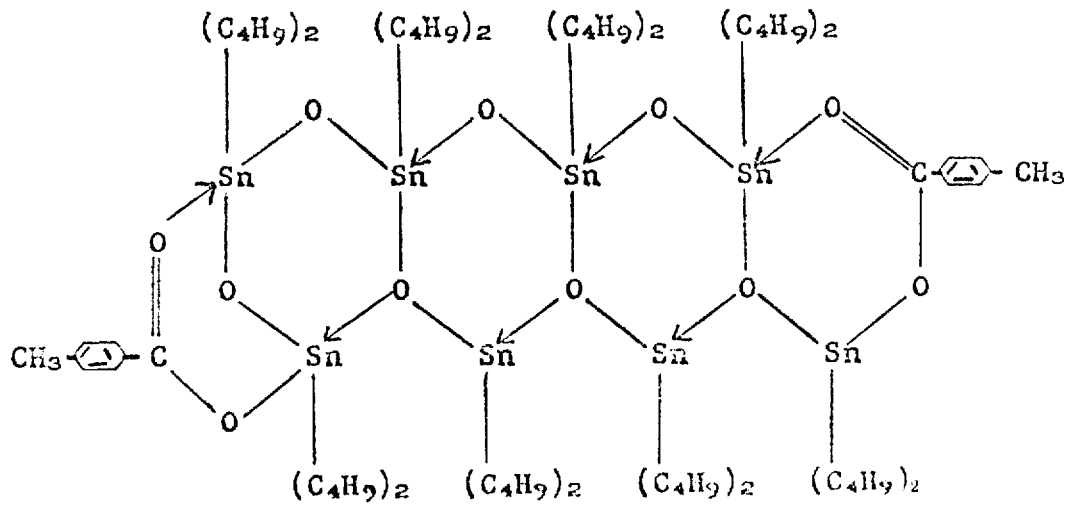

2. $x = 4$
   $y = 6$
$x/y$ = about 0.7 (0.67)
$z_1 = 4$
$z_2 = 0$
$R = \langle\_\rangle - CH_3$
$R_1R_2R_3R_4 = C_4H_9$
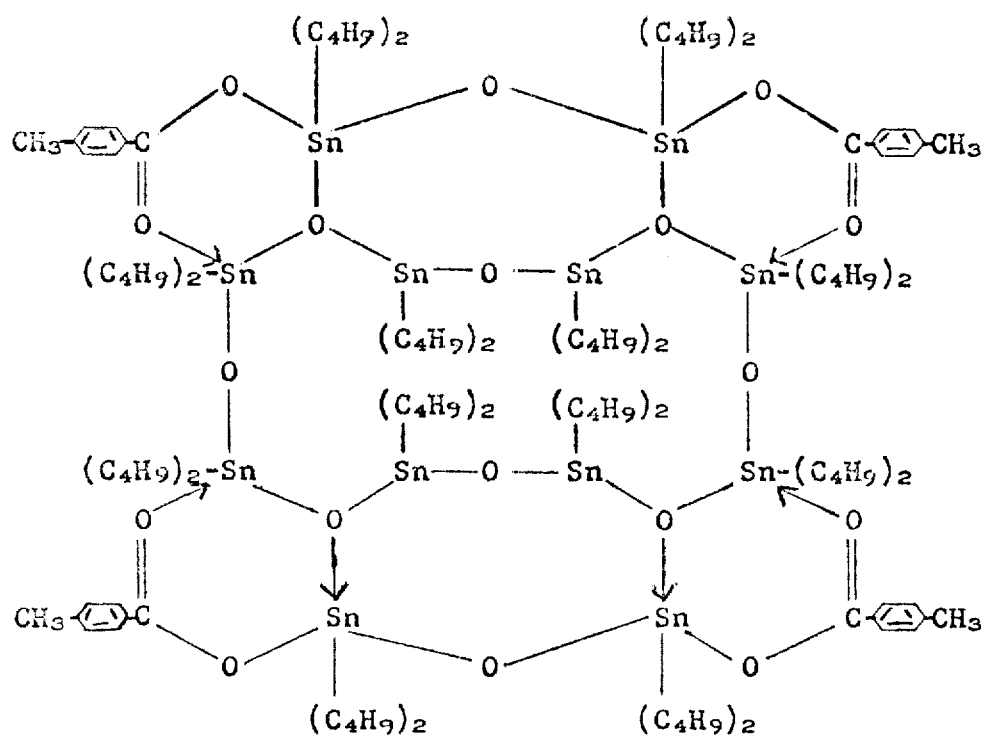
3. $x = 4$
   $y = 5$
$x/y = 0.8$
$z_1 = 3$
$z_2 = 0$
$R = \langle\_\rangle - CH_3$
$R_1R_2R_3R_4 = C_4H_9$
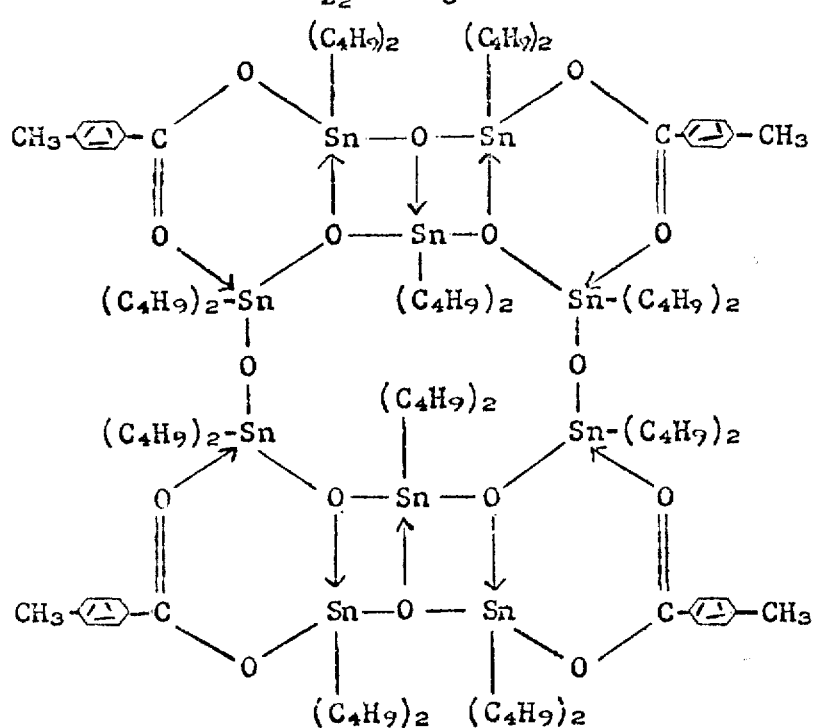

4.  $x = 2$      $x/y = 1.0$      $R = \underset{}{\bigcirc}-CH_3$
    $y = 2$      $z_1 = 1$        $R_1R_2R_3R_4 = C_4H_9$
                 $z_2 = 0$
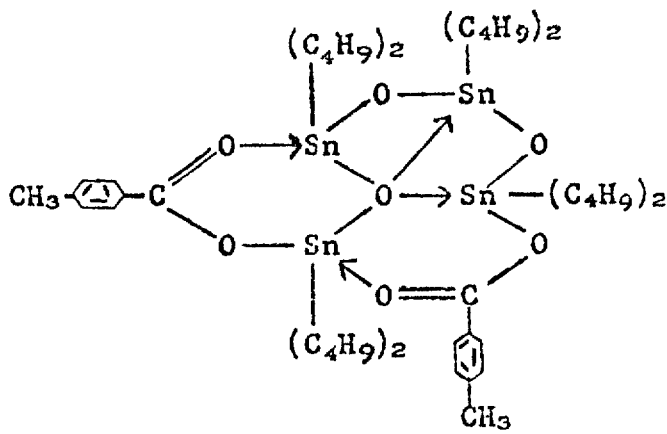
5.  $x = 6$      $x/y = 1.2$      $R = \underset{}{\bigcirc}-CH_3$
    $y = 5$      $z_1 = 2$        $R_1R_2R_3R_4 = C_4H_9$
                 $z_2 = 0$
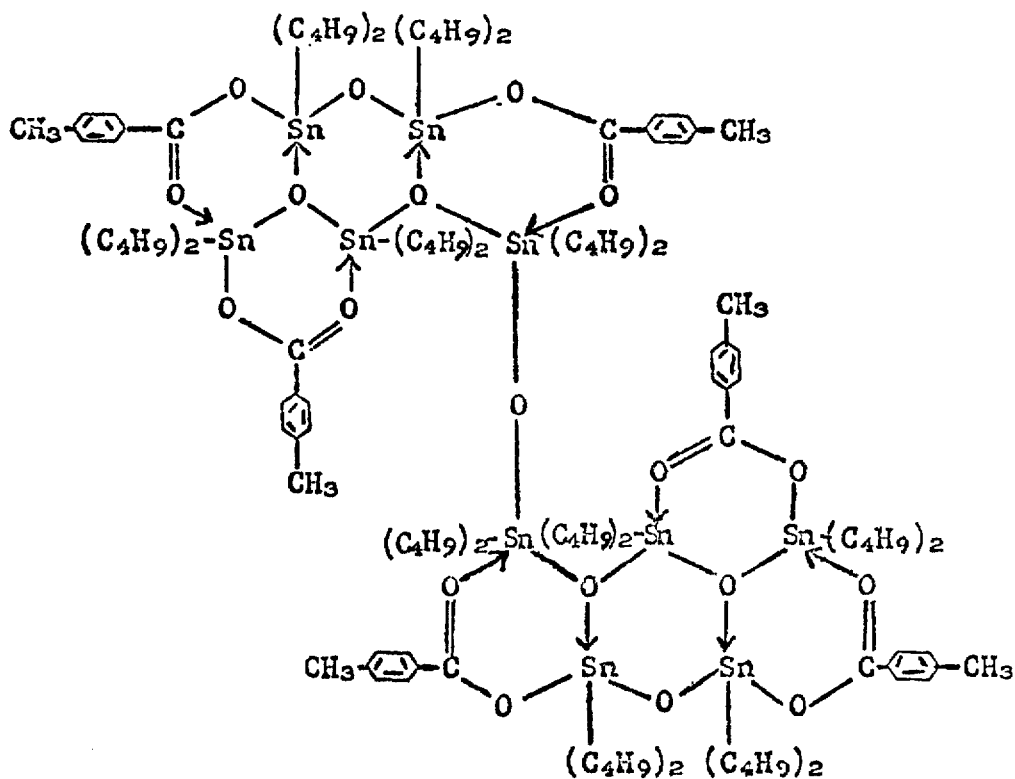

6.  $x = 6$   $x/y = 1.5$   $R = \langle\rangle\text{-}CH_3$
    $y = 4$   $z_1 = 1$
              $z_2 = 0$   $R_1R_2R_3R_4 = C_4H_9$
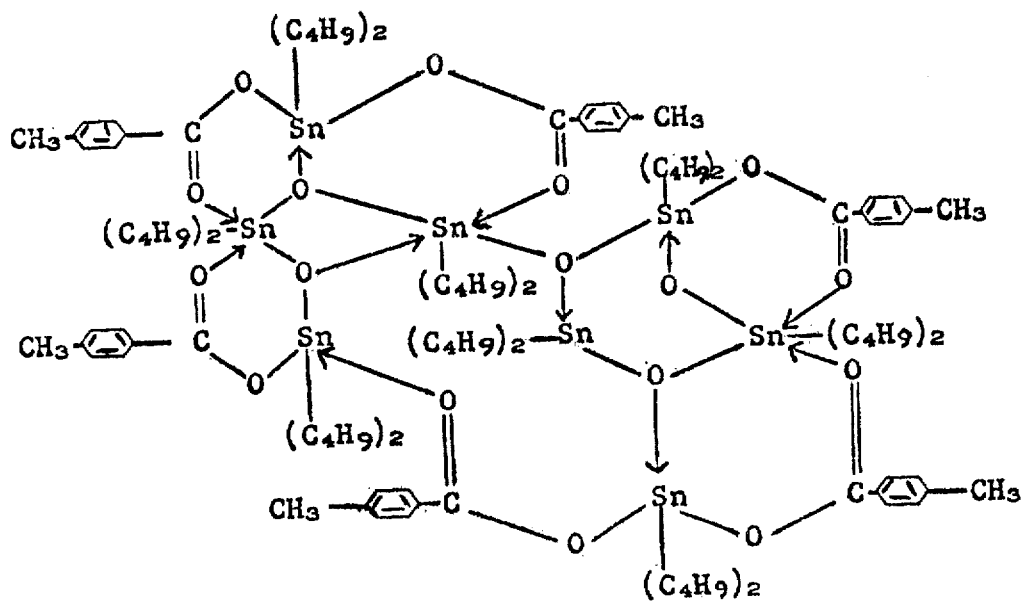
7.  $x = 8$   $x/y = 1.6$   $R = \langle\rangle\text{-}CH_3$
    $y = 5$   $z_1 = 1$
              $z_2 = 0$    $R_1R_2R_3R_4 = C_4H_9$
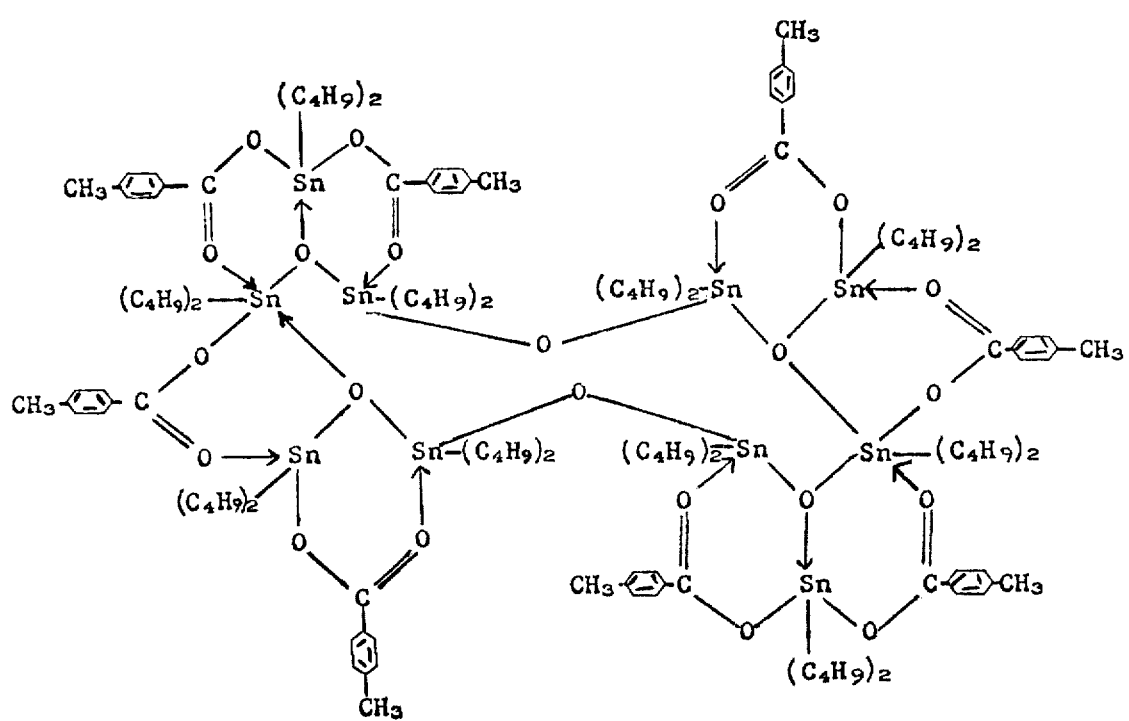

8. $x = 2$     $x/y = 2$     $R = \langle\underline{\phantom{o}}\rangle-CH_3$
    $y = 1$     $z_1 = 0$     $R_1R_2R_3R_4 = C_4H$
             $z_2 = 0$
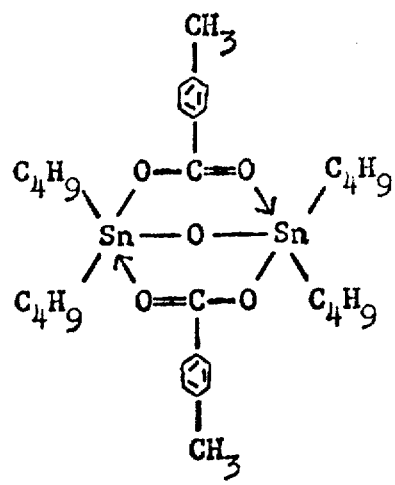
9. $x = 4$     $x/y = 2$     $R = \langle\underline{\phantom{o}}\rangle-CH_3$
    $y = 2$     $z_1 = 0$     $R_1R_2R_3R_4 = C_4H$
             $z_2 = 0$
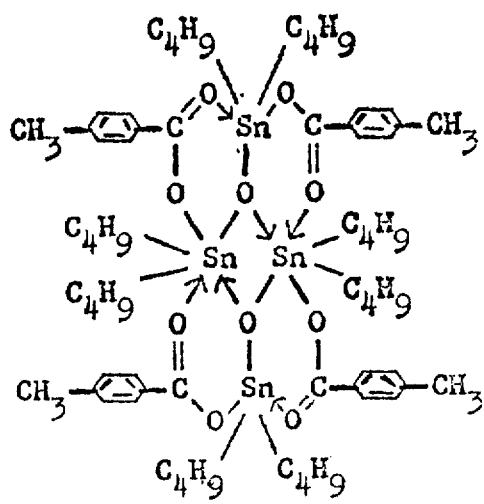

10.     $x = 4$        $x/y = 2$        $R =$ ⌬–$CH_3$
      $y = 2$        $z_1 = 0$        $R_1R_2R_3R_4 = C_4H_9$
                        $z_2 = 0$
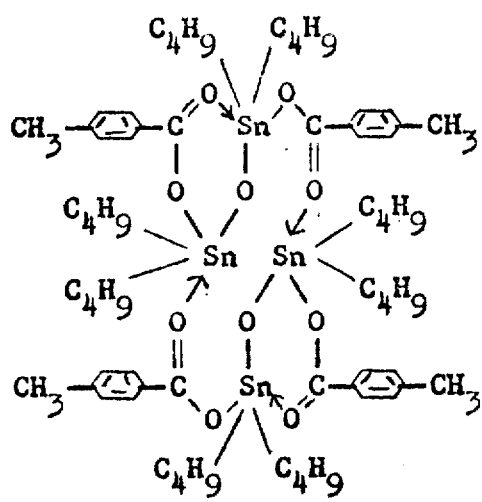
11.     $x = 6$        $x/y = 2.4$        $R =$ ⌬–$CH_3$
      $y = 5$        $z_1 = 0$        $R_1R_2R_3R_4 = C_4H_9$
                        $z_2 = 1$
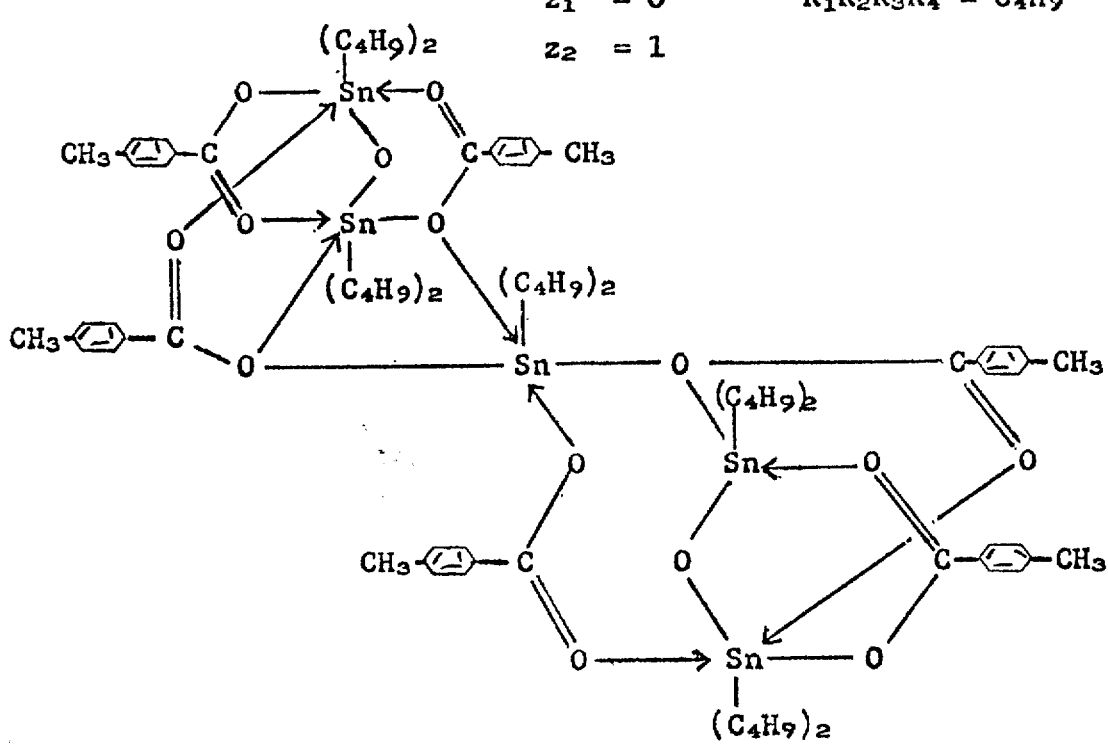

12. $x = 6$
 $y = 2$
 $x/y = 3.0$
 $z_1 = 0$
 $z_2 = 2$
 $R = \langle\phantom{x}\rangle\text{--}CH_3$
 $R_1R_2R_3R_4 = C_4H_9$
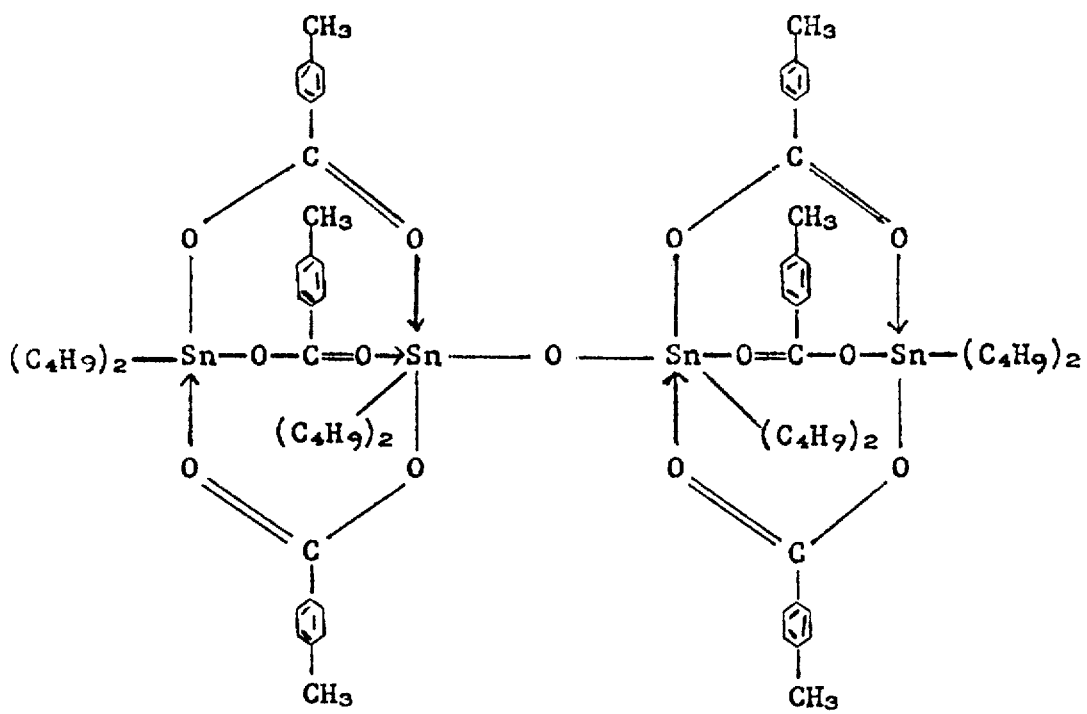
13. $x = 6$
 $y = 2$
 $x/y = 3.0$
 $z_1 = 0$
 $z_2 = 2$
 $R = \langle\phantom{x}\rangle\text{--}CH_3$
 $R_1R_2R_3R_4 = C_4H_9$
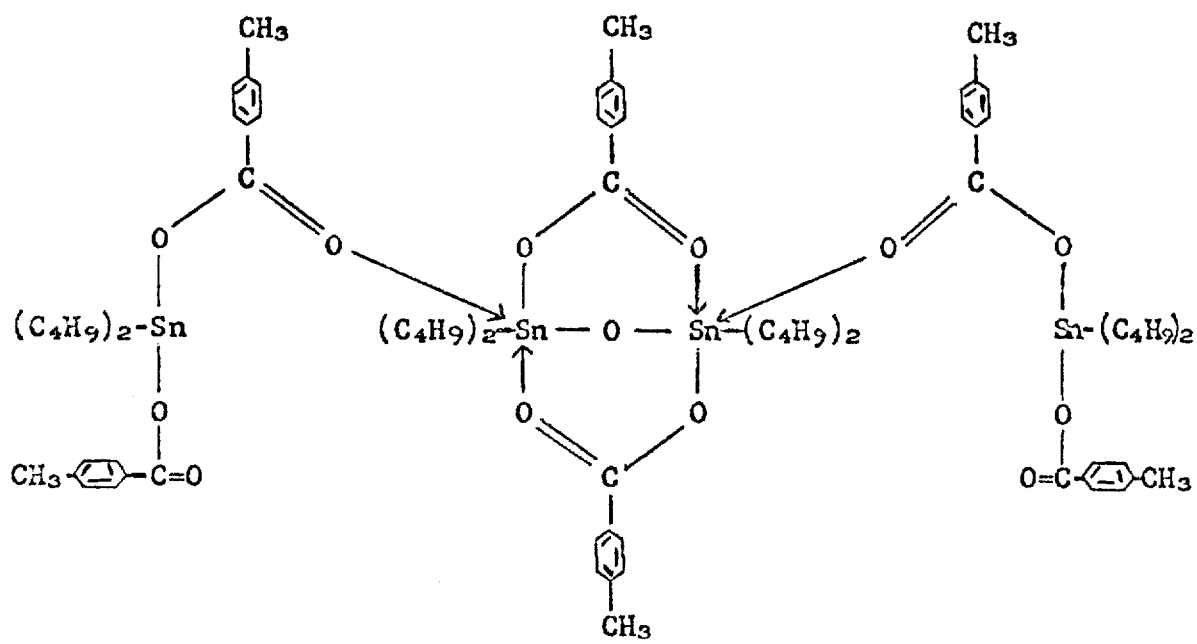

| 14. | x = 2 | x/y = 4.0 | R = ⟨∅⟩-CH₃ |
|---|---|---|---|
| | y = 0.5 | $z_1 = 0$ | |
| | | $z_2 = 1$ | $R_1R_2R_3R_4$ - $C_4H_9$ |

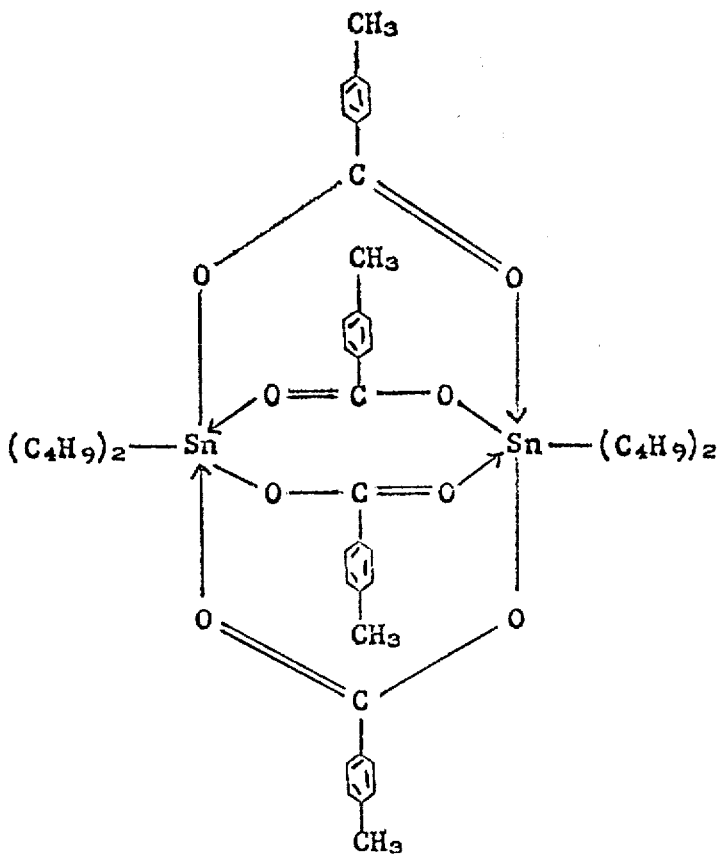

The exact cyclic structure is not fully understood; however, it is believed that the resonance contribution of the aromatic acyl groups may favor the formation of a ring structure which is actually a resonance hybrid of the structures shown by the Formulae 1 to 14, above, as in an aromatic ring. Therefore, the indication of single and double carbon-oxygen bonds, and covalent and coordinate tin-oxygen bonds, are arbitrary. Such a resonating structure would have a high degree of stability, analogous to an aryl ring.

It is also possible to describe these organotin compounds by the simplified representation shown below, omitting the

groups, which are not always present and are not components imparting crystallinity and the other distinctive features of the compounds of the invention.

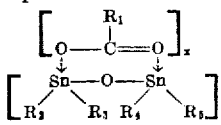

In this formula, $R_1$, $R_2$, $R_3$, $R_4$ and $R_5$, $x$, $y$ and $x/y$ are as above.

The following compounds are given, using this simplified representation, as illustrative of compounds falling within the invention. It will be understood that these compounds can have a cyclic structure as indicated above, according to the values of $x$ and $y$. The following simplified formulae merely suggest the cyclic structure of these compounds.

1.

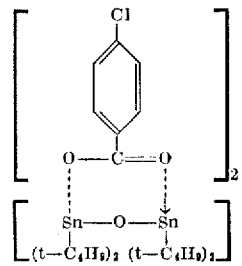

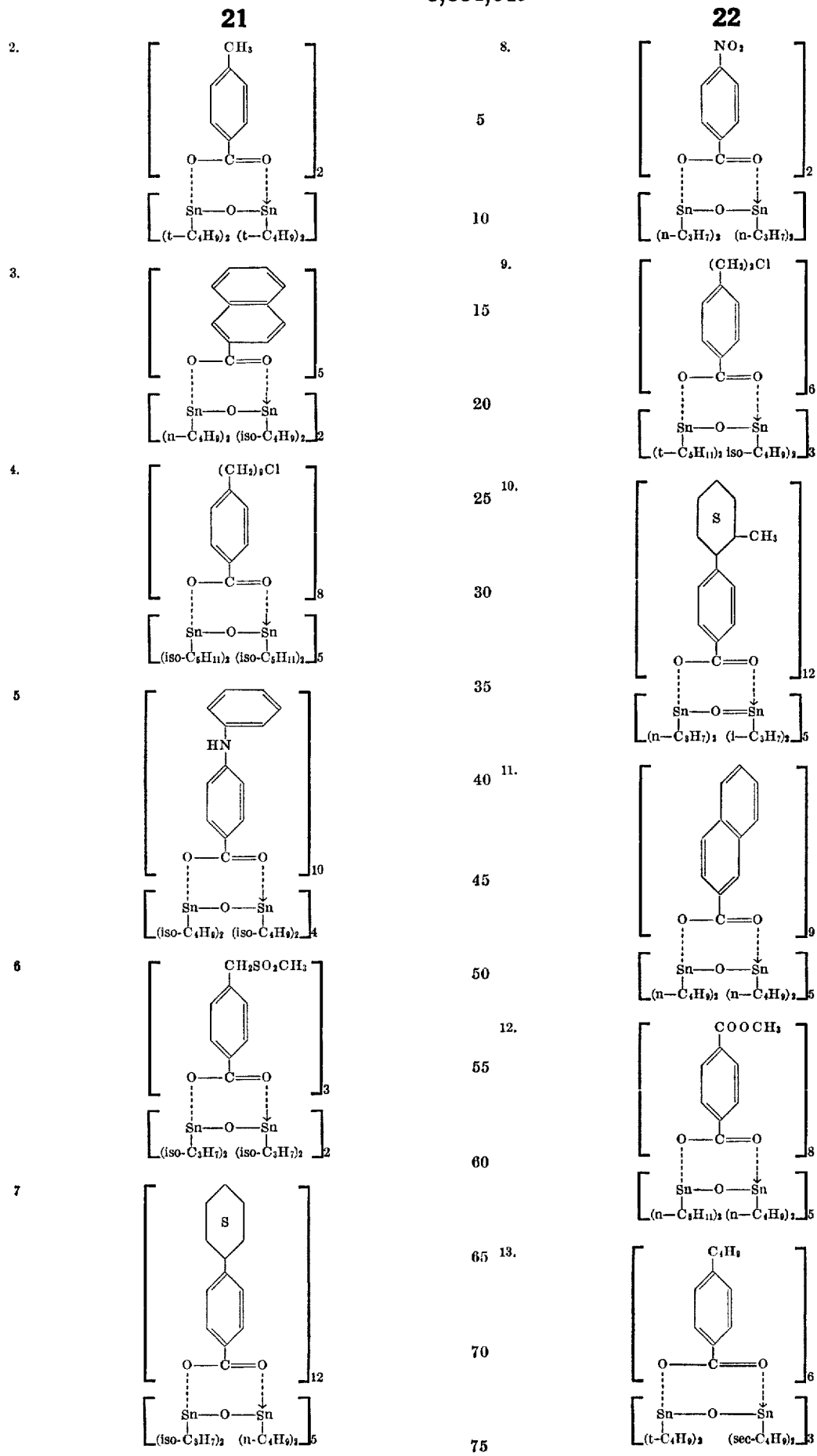

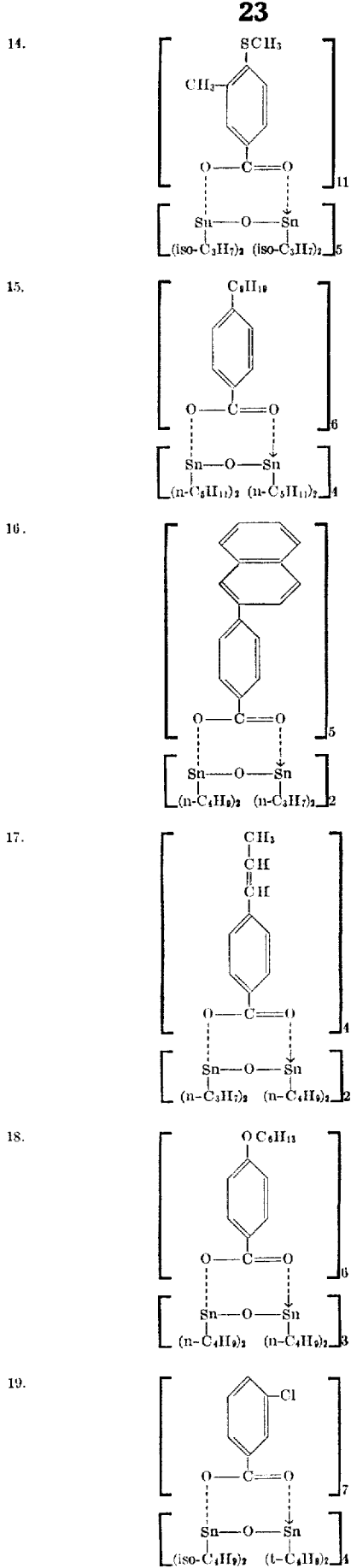

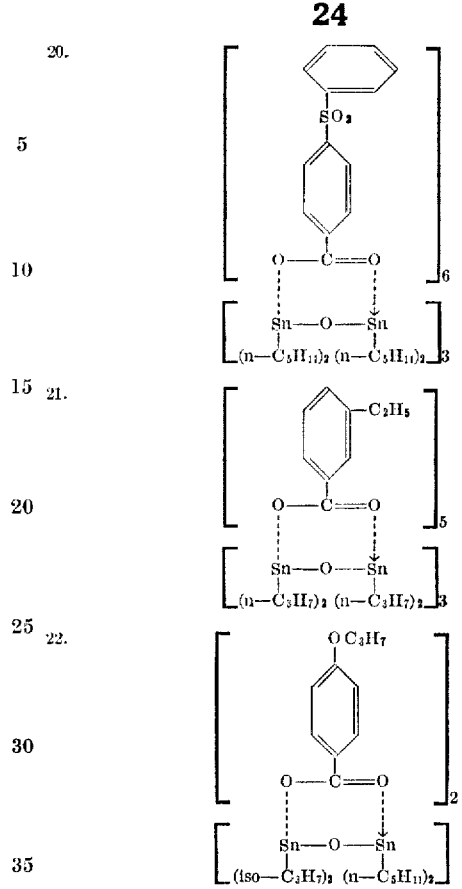

The dialkyltin salts coming within the invention are crystalline solids, and have melting points above 90° C. within the degree of polymerization indicated above. These compounds form needles or granular crystals, depending on the solvent from which they are crystallized.

The crystal structure is not the same as that of dialkyltin oxide, showing that these polymeric organotin salt are true compounds, and not mere mixtures of the dialkyltin aromatic acid carboxylate and dialkyltin oxide. In this respect, they differ from the higher polymers of U.S. Patent No. 2,628,211, which discloses these higher-melting solids as being waxy or amorphous in nature, and not crystalline.

These compounds can be prepared by reaction of the corresponding aromatic acid with an excess of organotin oxide above that necessary to form the normal salt, i.e. a salt having a single tin atom per molecule, or two acid groups per tin atom, e.g. $(R)_2Sn(OOCR_1)_2$.

Alternatively, these novel crystalline salts may be formed by the reaction of the corresponding dialkyltin dihalide and aromatic acid salt in the basic medium, e.g.

$$2R_2SnCl_2 + 2NaOOCR_1 + 2NaOH \rightarrow [R_2Sn(OOCR_1)]_2O + 4NaCl + H_2O$$

A preferred procedure is to react the normal dialkyltin aromatic acid carboxylate salt with a dialkyltin oxide to form the polymeric crystalline salts of this invention. The reaction is carried out above the melting point of the dialkyltin carboxylate salt product. The dialkyltin oxide is dissolved into the melted salt. The melt is kept at reaction temperature for between 15 and 30 minutes, and then cooled down. The resultant product is crystalline. The reaction temperature for the first reaction between the oxide and the acid is the same.

These compounds are excellent stabilizers for unplasticized (rigid) halogen-containing resins, because they are crystalline high-melting solids. Because of their high melting points, which are well above the heat deformation temperature of rigid PVC (80° C.), they do not degrade the mechanical properties of the resin below that temperature. Liquids and low melting or amorphous solids tend to structurally weaken a resin when present in high proportions.

These crystalline polymeric salts are easily formulated in powdered stabilizer formulations. They are compatible with the resins in the proportions required to effect good stabilization, and, accordingly, give clear formulations from which the stabilizer has no tendency to exude. Their solubility in most organic solvents is unexpectedly lower, and thereby they have a far lesser tendency to be leached out from, or to migrate from, the resin when it is used for the packaging of foods or other organic materials.

These crystalline cyclic polymeric salts are added in the amount from 0.5 to 10 parts by weight for 100 parts of resin, and preferably from about 1 to about 5 parts by weight.

The products of this invention are applicable to any polyvinyl chloride resin. The term "polyvinyl chloride" as used herein is inclusive of any polymer formed at least in part of the recurring group:

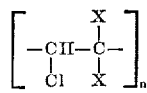

and having chlorine content in excess of 40%. In this group, the X groups can each be either hydrogen or chlorine, and $n$ is the number of such units in the polymer chain. In polyvinyl chloride homopolymers, each of the X groups is hydrogen. Thus, the term includes not only polyvinyl chloride homopolymers but also after-chlorinated polyvinyl chlorides as a class, for example, those disclosed in British Patent No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene. The invention also is applicable to mixtures of polyvinyl chloride in a major proportion with a minor proportion of other synthetic resins such as chlorinated polyethylene or a copolymer of acrylonitrile, butadiene and styrene.

The invention is of particular application to the stabilization of rigid polyvinyl chloride resin compositions, that is, resin compositions which are formulated to withstand high processing temperatures, of the order of 375° F. and higher, and whose mechanical strength would be adversely affected by a liquid or low melting additive. However, the stabilizer compositions of the invention can be used with plasticized polyvinyl chloride resin compositions of conventional formulation even though resistance to heat distortion is not a requisite. Conventional plasticizers well known to those skilled in the art can be employed such as, for example, dioctyl phthalate, octyl diphenyl phosphate and epoxidized soybean oil.

Particularly useful plasticizers are the epoxy higher esters having from 20 to 150 carbon atoms. Such esters will initially have had unsaturation in the alcohol or acid portion of the molecule, which is taken up by the formation of the epoxy group.

Typical unsaturated acids are acrylic, oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2 - ethyl hexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2 - propylene glycol, 1,4 - butylene glycol, neopentyl alcohol, ricinoleyl alcohol, erythritol, mannitol and sorbitol. Glycerol is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized coconut oil, epoxidized cotton-seed oil, epoxidized tall oil fatty acid esters and epoxidized tallow. Of these, epoxidized soybean oil is preferred.

The alcohol can contain the epoxy group and have a long or short chain, and the acid can have a short or long chain, such as epoxystearyl acetate, epoxystearyl stearate, glycidyl stearate, and polymerized glycidyl methacrylate.

The polymeric crystalline salts of the invention can, if desired, be employed in conjunction with other stabilizers for polyvinyl chloride resins.

As supplemental stabilizers, there can be employed metal salt stabilizers of the type described in the Leistner et al. Patents Nos. 2,564,646 and 2,716,092 and other patents in this field. The metal salt stabilizer is a salt of a polyvalent metal and an organic acid having from six to twenty carbon atoms. The acid should be monocarboxylic, and it should not contain nitrogen atoms in the molecule. Aliphatic, aromatic, alicyclic and oxygen-containing heterocyclic monocarboxylic acids are operative, as a class. The acids may be substituted, if desired, with groups such as halogen, sulphur, and hydroxyl. The oxygen-containing heterocyclic acids include oxygen and carbon in the ring structure, of which alkyl-substituted furoic acids are exemplary. As exemplary of the acids there can be mentioned the following: caproic acid, capric acid, 2-ethyl hexoic acid, lauric acid, chlorocaproic acid, hydroxy capric acid, stearic acid, hydroxy stearic acid, palmitic acid, oleic acid, myristic acid, dodecyl thioether propionic acid $C_{12}H_{25}$—S—$(CH_2)_2$—COOH, hexahydrobenzoic acid, benzoic acid, phenylacetic acid, isobutylbenzoic acid, monoethyl ester of phthalic acid, ethyl benzoic acid, isopropyl benzoic acid, ricinoleic acid, p - t - butylbenzoic acid, n - hexyl benzoic acid, salicyclic acid, naphthoic acid, 1 - naphthalene acetic acid, orthorbenzoyl benzoic acid, naphthenic acids derived from petroleum, abietic acid, dihydroabietic acid, and methyl furoic acid. These are used in the form of their metal salts, particularly the alkaline earth metal salts, such as magnesium, barium, strontium and calcium, and the zinc, cadmium, lead and tin salts. Where these salts are not known, they are made by the usual types of reaction, such as by mixing the acid, acid chloride or anhydride with the corresponding oxide or hydroxide of the metal in a liquid solvent, and heating, if necessary, until salt formation is complete. The barium, cadmium and zinc compounds are preferred.

Additional stabilizers which add to the heat stabilizing efficiency of the compounds of this invention and which particularly impart important oxidation resistance to the resins are the phenols. The phenol compounds have the structure:

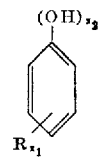

wherein R can be hydrogen, alkyl, aryl, alkenyl, alkaryl, aralkyl, cycloalkyl, hydrocarbon groups containing from one to thirty carbon atoms, heterocyclic sulfur containing groups, alkoxy, halogen, or acyl (R'C=O—), where R' is aryl, alkyl or hydrogen and $x_1$ and $x_2$ are integers from one to four, and the sum of $x_1$ and $x_2$ does not exceed six.

Polycyclic phenols include groups which are linked by thio or oxyether groups or by alkylene, alicyclene or arylene groups and are defined by the formula:

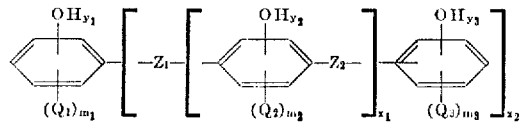

wherein $Q_1$, $Q_2$, and $Q_3$ are each inert substituent groups on the phenyl nucleus; $Z_1$ and $Z_2$ are bivalent linking radicals; $m_1$ is an integer from zero to a maximum of $5-(x_2+y_1)$, $m_2$ can be an integer from zero to three and $m_3$ an integer from zero to four; $x_1$ can be an integer from zero to about six and $x_2$ an integer from one to five, preferably one. Preferably, the hydroxyl groups in polycyclic phenols are located ortho and/or para to Z. There can be one or more hydroxyl groups per phenyl nucleus, $y_1$, $y_2$ and $y_3$ representing the number thereof. Preferably, there will be only one hydroxyl group per phenyl nucleus. The phenolic hydroxyl may be either hindered, i.e., substituted in both positions ortho to the hydroxyl group, or partially hindered or unhindered, i.e. substituted in one or neither position.

Z can be a single bond, as in diphenyl, or a bivalent group such as:

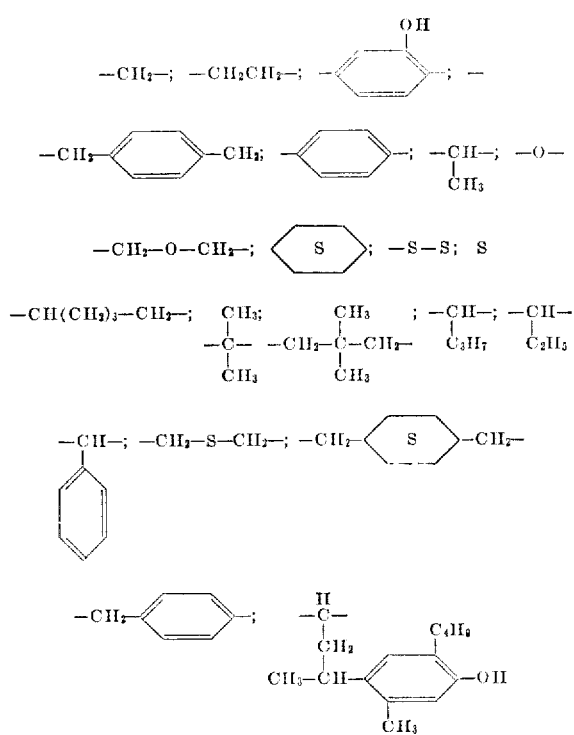

Representative phenols include guaiacol, resorcinol monoacetate, vanillin, butyl salicylate, 2,6 - ditert-butyl-4-methyl, phenol, 2 - tert-butyl - 4 - methoxy phenol, 2,4-dinonyl phenol, 2,3,4,5 - tetradecyl phenol, tetrahydro-α-naphthol, ortho, meta and paracresol, ortho, meta and para-phenylphenol, ortho, meta and para-xylenols, the carvenols, symmetrical xylenol, thymol, ortho, meta and para-nonylphenol, ortho, meta and para-dodecyl phenol, and ortho, meta and para-octyl phenol, o- and m- tert butyl-p-cresol, p-n-decyloxy phenol, p-n-decyloxy cresol, nonyl n-decyloxy cresol, eugenol, isoeugenol, glyceryl monosalicylate, methyl-p-hydroxybenzoate, ethyl - p - hydroxy cinnamate, 4 - benzyloxyphenol, p-acetylaminophenol, p-stearylaminophenol, p-di-chlorobenzoylaminophenol and p-hydroxysalicyl anilide.

Exemplary polyhydric phenols are orcinol, propyl gallate, catechol, resorcinol, 4-octyl resorcinol, 4-dodecyl resorcinol, 4 - octadecyl catechol, 4 - isooctyl-phloroglucinol, pyrogallol, hexahydroxy benzene, 4-isohexylcatechol, 2,6 - ditertiary-butyl resorcinol, 2,6 - diisopropyl phloroglucinol.

Exemplary polyhydric bisphenols are methylenebis(2,6-ditertiarybutyl-phenol),
2,2-bis-(4-hydroxy phenyl) propane,
methylene-bis-(p-cresol),
4,4'-oxobis-(3-methyl-6-isopropyl phenol),
2,2'-oxobis-(4-dodecyl phenol),
4,4'-n-butylidenebis-(2-tertiary butyl-5-methylphenol),
4,4'-benzylidenebis-(2-tertiary butyl-5-methylphenol),
4,4'-cyclohexylidenebis-(2-tertiary butylphenol),
4,4'-thiobisphenol,
4,4'-thiobis(3-methyl-6-tertiary-butylphenol),
2,2'-thiobis(4-methyl-6-tertiary-butylphenol),
2,2'-methylenebis(4-methyl-6-(1'-methyl-cyclohexyl)-phenol),
2,6-bis(2'-hydroxy-3'-tertiary-butyl-5'-methylbenzyl)-4-methylphenol,
1,1,3-tris(2'-methyl-4'-hydroxy-5'-tert butylphenyl) butane.

Aromatic amines which may be added to the crystalline salts of this invention as supplemental stabilizers are represented by the formula:

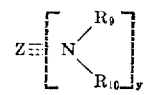

wherein Z is an aromatic neucleus containing one or more separate or condensed aromatic rings, such as benezene and naphthalene rings, the nitrogen atom being attached to the ring as a substituent, or constituting a ring atom in a heterocyclic ring, which may itself be saturated or unsaturated, or even aromatic, and wherein $R_9$ and $R_{10}$ are present depending on the number of valences of the nitrogen unattached to the ring. $R_9$ and $R_{10}$ can each be hydrogen or alkyl, aryl, alkaryl, aralkyl or cycloalkyl hydrocarbon groups containing from one to thirty carbon atmos. Preferably, each of $R_9$ and $R_{10}$ contains from one to ten carbon atoms. y can be any integer from one to the maximum number of available positions for substituents on the aromatic nucleus, usually six or eight per nucleus. These aromatic amine stabilizers are more fully set forth in U.S. application Ser. No. 161,769, filed on Dec. 19, 1961 by Otto S. Kauder.

Also effective as stabilizers are organic compounds containing at least one epoxy group. These compounds may be used to supplement the essential stabilizers. The amount can range from 0 to 100 parts by weight per 100 parts of resin, depending upon the effect desired; as many epoxy compounds are also plasticizers for polyvinyl chloride resins, the amount to be added will depend on whether it is desired to plasticize the resin.

Any epoxy compound can be used. The compounds can be aliphatic or cycloaliphatic in character, but aromatic, heterocyclic, and alicyclic groups can also be present. The compounds have from 10 to 150 carbon atoms. The longer chain aliphatic compounds of 22 carbon atoms and more are also plasticizers. These are more fully set out in U.S. application Ser. No. 161,769 filed Dec. 19, 1961 by Kauder. Typical epoxy stabilizer compounds that are not also plasticizers include epoxy carboxylic acids such as epoxy stearic acid, glycidyl ethers of polyhydric alcohols and phenols, such as triglycidyl glycerine, diglycidyl ether of diethylene glycol, glycidyl epoxy stearyl ether, 1,4-bis(2,3-epoxy-propoxy) benzene, 4,4'-bis(2,3-epoxypropoxy) diphenyl ether, 1,8-bis(2,3-epoxypropoxy) octane, 1,4-bis(2,3-epoxypropoxy) cyclohexane, and 1,3-bis(4,5-epoxy pentoxy) 5-chlorobenzene, the epoxypolyethers of polyhydric phenols, obtained by reacting a polyhydric phenol with a halogen-containing epoxide or dihalohydrin, such as the reaction products of resorcinol, catechol, hydroquinone, methyl resorcinol or polynuclear phenols such as 2,2'-bis(4-hydroxyphenyl) propane (Bisphenol A), 2,2-bis(4-hydroxyphenyl) butane, 4,4'-dihydroxybenzophenone and 1,5-dihydroxy naphthalene with halogen-containing epoxides such as 3-chloro-1,2-epoxybutane, 3-chloro-1,2-epoxyoctane and epichlorhydrin.

Organic sulfides containing the nucleus

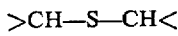

in the molecule, are extremely effective supplemental stabilizers with the organotin materials of this invention. This group can be attached to other structures forming saturated or unsaturated straight or branched open chain or carbocyclic or nonaromatic heterocyclic sulfides. The groups attached to the nucleus can be substituted with other groups such as alkyl, aryl, carbonyl, alkoxy, aryloxy, amido, nitrile, ester, oxyether, thioether, hydroxyl and halogen groups.

The preferred organic sulfides can be characterized by the formula:

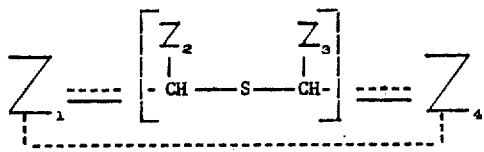

in which $Z_1$, $Z_2$, $Z_3$ and $Z_4$ can each be hydrogen or an organic group containing from one to about thirty carbon atoms. $Z_1$ and $Z_4$ can be taken together as a heterocyclic ring including the sulfur. $Z_1$, $Z_2$, $Z_3$ and $Z_4$ can for example be saturated or unsaturated hydrocarbon radicals such as alkyl, alkenyl, cycloalkyl, arylalkyl and alkylarylalkyl, or radicals including oxygenated groups and/or additional oxy- and thiocarboxylic acid, oxy- and thiocarboxylic ester, hydroxyl, amido, nitrile, oxyether, thioether, and carbonyl groups and halogen atoms such as chlorine, bromine and iodine.

Among the solid high melting sulfur compounds which may be added for their heat stabilizing properties, are included thiomalic acid, which is excellent for its good color retention and moderate odor. Other useful solid sulfur additives include elemental sulfur, 2-mercaptobenzoic acid, thiodipropionic acid and thiodiacetic acid.

Another group of organic sulfur-containing compounds which are excellent supplemental stabilizers for use with the crystalline organotin compounds of this invention are the mercapto-acid compounds. These include the aliphatic, aromatic, cycloaliphatic and heterocyclic acids, which contain at least one mercapto group, and can also contain inert substituents such as halogen, hydroxyl, keto and alkoxy groups, such as, for example, mervaleric acid, mercaptohexanoic acid, mercaptooctanoic leic acid, mercaptooleic acid, mercaptoricinoleic acid, mercaptostearic acid, mercaptobutyric acid, mercaptovaleric acid, mercaptohexanoic acid, mercaptooctanoic acid, thiolactic acid, mercaptolevulinic acid, mercaptolauric acid, mercaptobehenic acid, thiotartaric acid, mercaptopalmitic acid, mercaptomethylbenzoic acid, mercaptocyclohexane carboxylic acid, mercaptofuroic acid, mercaptoglutaric acid, mercaptoazelaic acid, mercaptomalonic acid, mercaptoadipic acid, mercaptopimelic acid, mercaptosuberic acid, mercaptosebacic acid, and mercaptoterephthalic acid, and their metal salts, and esters thereof with mono and polyhydric alcohols having from one to about thirty carbon atoms.

A total of from 0.5 to 10 parts by weight of the stabilizers can be used for each 100 parts by weight of the resin. More stabilizer composition can be used, but usually no better results are obtained, and therefore such amounts are uneconomical and wasteful. Furthermore, to preserve the advantages of using the crystalline high-melting salts of this invention with rigid polyvinyl chloride resins, if any liquid supplemental additives are used they should be kept to a minimum.

A small amount, usually not more than 1.5% of a parting agent, also can be included. Typical parting agents are the higher aliphatic acids having from twelve to twenty-four carbon atoms, such as stearic acid, lauric acid, palmitic acid, and myristic acid, mineral lubricating oils, 1,3-butylene glycol ester of oxidized montan wax fatty acids, polyvinyl stearate, polyethylene and paraffin wax.

This new solid stabilizer material can of couse be used with many of the liquid prior art additives listed above. However, it is obvious that when using these liquid additives or when using plasticized resin, much of the advantage gained in the mechanical properties of the resin by the use of the solid stabilizer is lost or becomes unnecessary. Therefore, it is the solid additives combined with these crystalline basic organotin salts which provide the best combination of additives.

The preparation of the stabilized composition is easily accomplished by conventional procedures. The selected stabilizer combination ordinarily is blended with the polyvinyl chloride resin, using, for instance, plastic mixing rollers, at a temperature at which the mix is fluid and thorough blending facilitated, milling the stabilizer with the resin on a 2-roll mill at from 250° to 350° F. for a time sufficient to form a homogeneous sheet, five minutes, usually. If desired, a plasticizer can be added to the resin mixture any time prior to milling the mixture. After the mass is uniform, it is sheeted off in the usual way.

Example 1

A high melting cyclic crystalline salt, bis(dibutyltin) di(p-t-butyl benzoate), was prepared by reacting dibutyltin oxide with p-tert-butyl benzoic acid at 180° C. in the ratio of 1:1. The product was a crystalline solid which melted at about 169–172° C. The product was analyzed to obtain the alkyl tin oxide content by titrating one gram samples of the organotin compound dissolved in 25 cc. glacial acetic acid with a 2 N/10 HBr dissolved in glacial acetic acid according to the equation, for a normal salt, for example:

$(R)_2Sn—(OOCR_1)_2 + 2HBr$
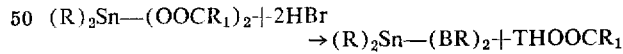

The titration is continued to an endpoint indicated by Crystal Violet. The results are shown in Table I. In this and the following examples $R_2$, $R_3$, $R_4$ and $R_5$ are generally the same groups unless indicated otherwise. The "degree of polymerization" is given as the ratio $x/y$.

Examples 2 to 6

Dibutyltin oxide was reacted with para-toluic acid at 180° C. A portion was reacted in a 1.5:2 molar ratio, oxide-to-acid, another portion in a 1.9:2 molar ratio, and a third in a 1:1 molar ratio. Portions of dibutyltin oxide were also reacted with ortho-toluic acid in molar ratios of 3:2 and 2:1. The melting points were determined and are also given in Table I below as Examples 2 to 6 respectively.

Examples 7 to 20

Similarly, melting points were otbained for various other crystalline dialkyltin salts formed as described in Examples 1 to 6, using the corresponding dialkyltin oxides and aromatic acids. The materials are set out in Table I as Examples 7 to 20, along with their melting points.

TABLE I
MELTING POINTS OF $$\left[O-\underset{|}{C}=O\right]_x$$
$$\left[\underset{R_2}{Sn}\diagdown\underset{R_3}{O}=\underset{R_4}{Sn}\diagdown R_5\right]_y$$

TABLE I

| Example No. | $R_1$ | $R_2, R_3, R_4, R_5$ | x/y | Melting Point, °C. | Analysis, (Percent $(R_{2,3,4,5})$ Sn) |
|---|---|---|---|---|---|
| 1 | p-(CH$_3$)$_3$C—C$_6$H$_4$ | n-C$_4$H$_9$ | 2.0 | 169–172 | 54.5 |
| 2 | p-CH$_3$C$_6$H$_4$ | n-C$_4$H$_9$ | 2.7 | 107–114 | 56.3 |
| 3 | p-CH$_3$C$_6$H$_4$ | n-C$_4$H$_9$ | 2.0 | 144–146 | 61.8 |
| 4 | p-CH$_3$C$_6$H$_4$ | n-C$_4$H$_9$ | 1.9 | 112–126 | 64.0 |
| 5 | o-CH$_3$C$_6$H$_4$ | n-C$_4$H$_9$ | 1.3 | 89–93 | 70.5 |
| 6 | o-CH$_3$C$_6$H$_4$ | n-C$_4$H$_9$ | 1 | 104–107 | 74.0 |
| 7 | β-C$_{10}$H$_7$ | n-C$_4$H$_9$ | 2.5 | 97–99 | 50.8 |
| 8 | β-C$_{10}$H$_7$ | n-C$_4$H$_9$ | 2.0 | 135–137 | 56.1 |
| 9 | β-C$_{10}$H$_7$ | n-C$_4$H$_9$ | 1.9 | 116–119 | 57.4 |
| 10 | β-C$_{10}$H$_7$ | n-C$_4$H$_9$ | 1.7 | 112–115 | 59.5 |
| 11 | p-ClC$_6$H$_4$ | n-C$_4$H$_9$ | 2.5 | 119–123 | 53.0 |
| 12 | p-ClC$_6$H$_4$ | n-C$_4$H$_9$ | 2.0 | 145–149 | 59.4 |
| 13 | p-ClC$_6$H$_4$ | n-C$_4$H$_9$ | 1.9 | 130–136 | 59.2 |
| 14 | p-ClC$_6$H$_4$ | n-C$_4$H$_9$ | 1.7 | 116–119 | 61.0 |
| 15 | p-C$_6$H$_5$C$_6$H$_4$ | n-C$_4$H$_9$ | 2.7 | 106–108 | 50.9 |
| 16 | p-C$_6$H$_5$C$_6$H$_4$ | n-C$_4$H$_9$ | 2.1 | 117–119 | 55.7 |
| 17 | p-C$_6$H$_5$C$_6$H$_4$ | n-C$_4$H$_9$ | 2.0 | 123–125 | 61.2 |
| 18 | p-C$_6$H$_5$C$_6$H$_4$ | n-C$_4$H$_9$ | 1.8 | 110–112 | 80.9 |
| 19 | p-(CH$_3$)$_3$C—C$_6$H$_5$ | n-C$_3$H$_7$ | 2.0 | 161–164 | 53.9 |
| 20 | m-CH$_3$C$_6$H$_5$ | n-C$_3$H$_7$ | 2.0 | 149–152 | 58.8 |

The unique property of the salts in the more preferred group, i.e. those having a melting point maximum at x/y is about 2.0, is shown by comparing the melting points of Examples 2–4, 7–10, 11–14 and 15–18. In each of these cases, the melting point is at a maximum when x/y is about 2.0.

Example 21

A series of plasticized formulations was prepared having the following composition:

Plastic composition: Parts by weight
Geon 101 EP (homopolymer of vinyl chloride) _____ 100
Dioctyl phthalate _____ 50
Wax E (1,3-butylene glycol ester of oxidized montan wax acid) _____ 0.25
Stabilizer _____ (¹)

¹ As shown in Table II.

The stabilizer was added in the proportions noted in Table II and was blended with the polyvinyl chloride resin. The mixture was fused on a two-roll mill and sheeted off. Samples were cut from the sheet and heated in an oven at 350° F. to determine heat stability. Samples were withdrawn at fifteen minute intervals, and the discoloration was noted. The color is reported in Table II below.

TABLE II

| | Composition | | |
|---|---|---|---|
| | A | B | Example 21 |
| | 2 parts dibutyltin dilaurate | 1.75 parts dibutyltin di-(p-tert butyl)benzoate (normal salt) | 1.25 parts bis dibutyltin di-(p-tert butyl benzoate) (x/y=2) ¹ |
| Time of heating, min.: | Color | Color | Color |
| 0 | Colorless | Colorless | Colorless. |
| 15 | Pale yellow | Pale yellow | Very pale yellow. |
| 30 | Yellow | Yellow | Pale yellow. |
| 45 | do | do | Yellow. |
| 60 | Deep yellow | Deep yellow | Deep yellow. |
| 75 | Dark yellow | Dark yellow | Dark yellow. |
| 90 | Yellow brown | Yellow brown | Yellow brown. |
| 105 | Yellow brown, w/black spot | Yellow brown, w/black spot | Do. |
| 120 | Charred | Charred | Do. |

¹ Identified as the compound of Example 1.

The results in Table II show that the polymeric crystalline salts of this invention (Example 21) are superior to the monomeric salts of the aromatic carboxylic acids and of the more commonly used dialkyltin salts of aliphatic acids, in stabilizing effectiveness.

Examples 22–25

Example 21 was repeated using a rigid unplasticized PVC resin formulation having the following composition:

Parts by weight
Homopolymer (Diamond 450) _____ 150
Thiomalic acid _____ 0.3
2,6-di-t-butyl-p-cresol _____ 0.6
Organotin compound _____ (¹)

¹ As shown in Table III.

The formulation was blended, shaped and tested as described in Example 21, with the tests being run at both 350° F. and 375° F. The organotin compounds added to the base formulation are set out in Table III with the test results.

The crystalline organotin compounds added are identified with reference to previous examples where they are fully described.

TABLE III

| Example No. | Organotin Compounds as shown in Table I | Parts by weight | Initial Color | Time (mins.) to reach— | | | |
|---|---|---|---|---|---|---|---|
| | | | | Moderate color change at— | | Severe discoloration at— | |
| | | | | 350° F. | 375° F. | 350° F. | 375° F. |
| Control | None | | Very light yellow | 15 | | 45 | |
| 22 | Example 5 | 1.5 | Colorless | 90 | 45 | >120 | 105 |
| 23 | Example 3 | 1.5 | do | 90 | 45 | >120 | 75 |
| 24 | Example 8 | 1.65 | do | 90 | 45 | >120 | 90 |
| 25 | Example 12 | 1.5 | do | 105 | 45 | >120 | 90 |

Table III indicates the initial color of the sample and the time it takes for a "moderate color change" to appear, as well as the time for "severe discoloration" to occur. By "severe discoloration" is meant the formation of an opaque, extremely dark or charred appearance.

Table III shows the effectiveness as a stabilizing additive for polyvinyl chloride resins of the crystalline organotin compounds of this invention at temperatures of 350° F. and 375° F. It shows the increased stabilization obtained when the organotin compounds are added to a control sample which contained only a phenolic antioxidant and a mercaptoacid compound.

Example 26

The procedure of Examples 22–25 was repeated using as the resin 127.5 parts of "Vinylite VYHH," a copolymer of 87% vinyl chloride and 13% vinyl acetate, and 22½ parts of "Vinylite VYNS," a copolymer of 90% vinyl chloride and 10% vinyl acetate. This copolymeric resin was blended, shaped and tested as in Examples 22–25. The materials did not char after more than 120 minutes in the oven at 350° F. indicating that the stabilizer combination of this invention is also effective with copolymers of vinyl chloride.

Examples 27–30

The procedure of Examples 22–25 was repeated in blending, shaping and testing a rigid resin formulation having the following composition:

| | Parts by weight |
|---|---|
| PVC homopolymer (Diamond 450) | 150 |
| Wax E (1,3-butyleneglycol ester of oxidized montan-wax acids) | 0.15 |
| 1,1,3 - tris (2'-methyl-4'-hydroxy-5'-t-butylphenyl) butane (antioxidant) | 0.15 |
| Bis (di-n-butyltin) di-(p-t-butylbenzoate) ($y=1$) ($x=2$) (Example 1) | 2.5 |
| Supplemental stablizier | (¹) |

¹ As shown in Table IV.

The test results for Examples 27–30 are given in Table IV, below.

TABLE IV

| Example No. | Additives | Parts by weight | Initial Color | Time (mins.) to reach severe discoloration at— | |
|---|---|---|---|---|---|
| | | | | 350° F. | 375° F. |
| Control | None | | Light tan | 90 | 45 |
| 27 | Sulfur | 0.3 | Colorless | >120 | 75 |
| 28 | Thiomalic acid | 0.3 | ......do | >120 | 120 |
| 29 | Thiodipropionic acid | 0.3 | ......do | >120 | 90 |
| 30 | Mercaptobenzoic acid | 0.3 | ......do | >120 | 90 |

The results of Table IV show the advantages to be sesured in increased stabilizing effectiveness by mixing with the crystalline cyclic organotin salts of this invention the supplemental stabilizers disclosed above. As shown in Table IV a true synergistic interaction results in far superior stabilizing activty.

Example 31

The solubility of the crystalline cyclic organotin salts was determined and compared to the corresponding normal salt of the crystalline material. Several one-gram samples of normal dibutyltin di(p-t-butylbenzoate)

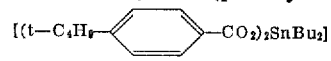

and of the corresponding crystalline cyclic polymeric organotin salt of this invention where $x/y=2.0$, were weighed into separate tared beakers and stirred with 10 ml. portions of the solvents shown in Table V, below. If the organotin compounds did not completely dissolve in the solvent at room temperature, the mixture was warmed up for up to one hour in a steam bath. If the organotin compound did not completely dissolve after one hour of heating, the mixture was allowed to settle and the supernatant liquid was decanted off, and the remaining solids were then washed with a liquid in which they were not soluble, and finally heated and dried in an oven at 70° C. The dried solid material, still in the tared beaker, was finally weighed to determine what portion of the original material had dissolved. The solubilities of the crystalline cyclic salt of this invention in the various solvents tested are shown in Table V as grams of compounds per hundred ml. of the solvent and also in terms of grams of tin dissolved per hundred ml. of solvent.

TABLE V

| Solvent | G. crystalline organotin compound dissolved/ 100 ml. solvent | G. tin/ 100 ml. solvent | Temperature required to effect solution, ° C. |
|---|---|---|---|
| Water | 0.2 | 0.057 | 60 |
| Methanol | 1.0 | 0.285 | 60 |
| Acetone | 1.7 | 0.485 | 60 |
| Isopropanol | 0.6 | 0.171 | 60 |
| Methyl-ethylketone | 6.8 | 1.94 | 60 |
| Hexane | 7.5 | 2.14 | 60 |
| Toluene | 7.9 | 2.25 | 60 |
| Chloroform | (¹) | 2.85 | 60 |

¹ 10 or more.

The normal organotin salt dissolved completely in all of the above solvents, except water, at a temperature of less than 45° C. showing a solubility of "10 g. or more" per 100 ml. of solvent. In water the solubility was 0.2 g. per 100 ml. solvent.

As shown in Table V, above, however, the crystalline polymeric cyclic salt of this invention is less soluble in all of the organic solvents tested, with the exception of chloroform. Furthermore, the crystalline cyclic organotin salt of this invention dissolved only when the solvent reached a temperature of 60° C.

Examples 32–34

The procedure of Examples 23 through 25 was repeated in blending, shaping and testing at 350° F. a plasticized formulation having the following composition.

| | Parts by weight |
|---|---|
| PVC homopolymer (Solvic 229) | 127.5 |
| Chlorinated polyethylene | 22.5 |
| Epoxidized soybean oil | 7.5 |
| 2,6-di-tert butyl-p-cresol | 0.6 |
| Stabilizing additives | (¹) |

¹ As shown in Table VI.

The test results for Examples 32 through 34 are given in Table VI, below.

TABLE VI

| Example No. | Additives | Parts by weight | Initial Color | Time (mins.) to reach severe discoloration at 350° F. |
|---|---|---|---|---|
| Control | Compound of Ex. 1 | 2.4 | Cloudy white | 30 |
| 32 | Compound of Ex. 1 / Sulfur | 1.8 / 0.6 | ....do | 75 |
| 33 | Compound of Ex. 1 / Thiodiacetic acid | 1.8 / 0.6 | Transparent white | 105 |
| 34 | Compound of Ex. 1 / Thiomalic acid | 1.65 / 0.3 | ....do | 120 |

The results of Table VI show the advantages as increased stabilizing effectiveness secured by mixing the crystalline cyclic organotin salts of this invention with the supplemental stabilizers disclosed above. As shown in Table VI a true synergistic interaction results in far superior stabilizing activity.

Having regard to the foregoing disclosure, the following is claimed as the inventive and patentable embodiments thereof:

1. A crystalline cyclic organotin salt of an aromatic carboxylic acid characterized by a melting point of at least 90° C., and comprising structural units having the formula:

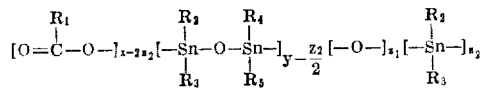

wherein:
$R_1$ is an aromatic radical having from six to about thirty carbon atoms and is attached to the carboxylic acid group by a carbon atom of the aromatic radical;
$R_2$, $R_3$, $R_4$ and $R_5$ are alkyl radicals having from three to five carbon atoms;
$x$ is a number within the range from about 0.7 to about 17;
$y$ is a number from about 1 to about 5;
the ratio $x/y$ is within the range from about 0.7 to about 3.5;
$z_1 = 2y - x/2$, and when $x$ is equal to or greater than $2y$, $z_1 = 0$;
$z_2 = x - 2y$, and when $2y$ is equal to or greater than $x$, $z_2 = 0$; and
when $2y - x = 0$ and $x - 2y = 0$, $z_1$ is equal to $z_2$, and both are equal to zero.

2. The crystalline salt of claim 1 wherein $R_1$ is selected from the group consisting of para- and meta-substituted phenyl, unsubstituted in the ortho-position, and beta-naphthyl.

3. The crystalline salt of claim 2 wherein the ratio of $x/y$ is in the range from about 1.7 to about 2.5.

4. The crystalline salt of claim 3 wherein $R_2$, $R_3$, $R_4$ and $R_5$ are all butyl.

5. The crystalline salt of claim 3 wherein $R_2$, $R_3$, $R_4$ and $R_5$ are all propyl.

6. The crystalline salt of claim 3 wherein $R_2$, $R_3$, $R_4$ and $R_5$ are all amyl.

7. The crystalline salt of claim 3 wherein $R_1$ is para-substituted phenyl, unsubstituted in the ortho-position.

8. The crystalline salt of claim 7 wherein $R_1$ is a p-alkyl substituted phenyl unsubstituted in the ortho-position.

9. The crystalline salt of claim 7 wherein $R_1$ is a p-halo substituted phenyl unsubstituted in the ortho-position.

10. The crystalline salt of claim 7 wherein $R_1$ is a p-aryl phenyl group unsubstituted in the ortho-position.

11. The crystalline salt of claim 3 wherein $R_1$ is $\beta$-naphthyl.

12. A process for preparing the crystalline cyclic organotin salt of claim 1 comprising reacting the corresponding normal dialkyltin salt of an aromatic carboxylic acid with a dialkyltin oxide selected from the group consisting of dipropyltin oxide, dibutyltin oxide, diamyltin oxide and isomers thereof.

References Cited

UNITED STATES PATENTS 2,628,211  2/1953  Mack et al. _____ 260—45.75

TOBIAS E. LEVOW, *Primary Examiner.*

W. F. W. BELLAMY, *Assistant Examiner.*

UNITED STATES PATENT OFFICE
CERTIFICATE OF CORRECTION

Patent No. 3,384,649                              May 21, 1968

Otto S. Kauder

It is hereby certified that error appears in the above numbered patent requiring correction and that the said Letters Patent should read as corrected below.

Column 2, line 58, "organtotin" should read -- organotin --. Column 3, lines 8 to 13, the formula should appear as shown below:

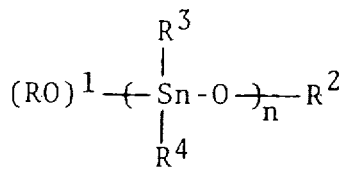

Column 5, line 32, "furfuyl" should read -- furfuryl --; line 43, "pyranlphenyl" should read -- pyranylphenyl --. Columns 11 and 12, the definition of the R radical, should appear as shown below:

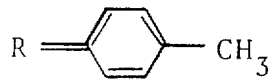

Column 19, lines 73 to 75, the lower portion of the formula should appear as shown below:

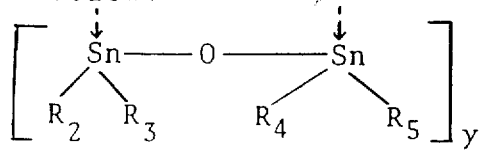

Column 22, formula 10, the lower portion of the formula should appear as shown below

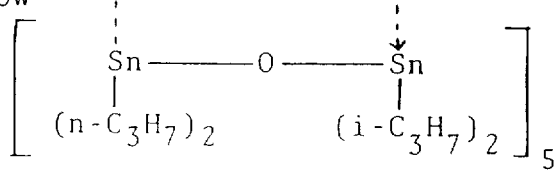

Column 27, lines 20 to 40, at the end of each line of groups insert a semicolon; line 31, "-S-S" should read -- -S-S- --; line 33, "-CH(CH$_2$)$_3$-CH$_2$-" should read -- -CH$_2$(CH$_2$)$_3$-CH$_2$- --;

line 57, "methyl, phenol" should read -- methyl phenol --.
Column 28, line 32, "neucleus" should read -- nucleus --;
line 33, "benezene" should read -- benzene --. Column 29,
lines 60 to 62, "mervaleric acid, mercaptohexanoic acid,
mercaptooctanoic leic acid" should read -- mercaptoacetic
acid, mercaptopropionic acid, mercaptolinoleic acid --.
Column 30, line 17, "couse" should read -- course --, line
51, "-(R)$_2$Sn-(BR)$_2$+THOOCR$_1$" should read -- (R)$_2$Sn-(Br)$_2$+2HOOCR$_1$
--. Column 31, first formula, the lower portion of the formula
should appear as shown below:

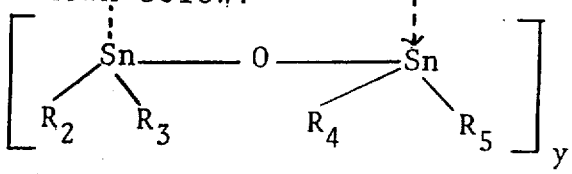

Columns 31 and 32, TABLE I, fourth column, line 3 thereof,
"144-146" should read -- 144-147 --. Column 34, TABLE V,
in the heading to the second column, line 1 thereof, and in
the heading to the third column, line 1 thereof, "G.", each
occurrence, should read -- g. --. Column 35, line 1, "as"
should read -- in --.

Signed and sealed this 28th day of October 1969.

(SEAL)
Attest:

EDWARD M. FLETCHER, JR.
Attesting Officer

WILLIAM E. SCHUYLER, JR.
Commissioner of Patents